UNITED STATES PATENT OFFICE.

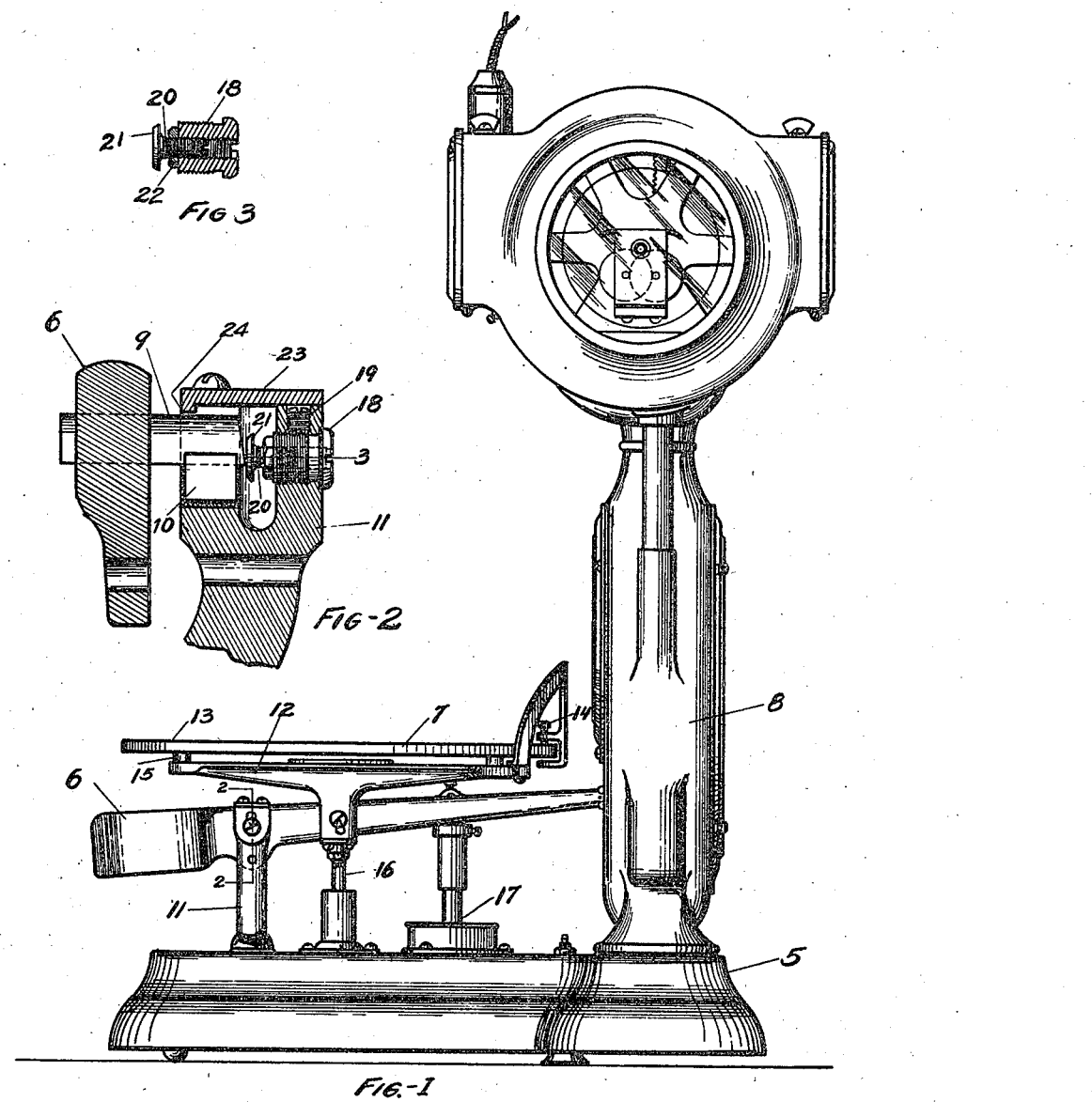

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING-SCALE.

1,310,948.              Specification of Letters Patent.        Patented July 22, 1919.

Original application filed September 25, 1911, Serial No. 651,045. Divided and this application filed November 6, 1915. Serial No. 59,922.

*To all whom it may concern:*

Be it known that I, CLARENCE H. HAPGOOD, a citizen of the United States, residing at Toledo, in the county of Lucas and State of Ohio, have invented certain new and useful Improvements in Weighing-Scales, of which the following is a specification.

My invention relates particularly to that class of weighing scales employing a pendulum as the variable counterbalance for the load of the commodity being weighed, and is illustrated in connection with a computing scale of the cylinder type, i. e., one utilizing a rotary cylindrical weight and value indicating chart having a series of annular rows of numerals, each row representing values of progressively greater weights of materials at a uniform price per unit of weight, and the several rows representing values at proportionately increasing prices per unit of weight; but it will be obvious from the following detail description that my invention is applicable to scales of other types than that above referred to, and though I herein describe my invention in connection with a rotary cylinder computing pendulum scale, I have done so merely for the purpose of illustration so far as many of the features of my invention are concerned and it is to be understood that I am not limited to this particular form of scale except in so far as it may form an element of the appended claims, which point out the true scope of my invention and are intended as a measure thereof, due allowance being made for equivalents.

Referring now to the drawings accompanying and forming a part of this specification, Figure 1 is a side elevation of a computing pendulum scale embodying my invention; Fig. 2 is an enlarged detail sectional view taken substantially on the line 2—2 of Fig. 1; and Fig. 3 is a detail sectional view along the line 3 of Fig. 2. Similar reference numerals designate similar parts throughout the several views.

It will not be necessary to give a detail description of the particular type of weighing scale here chosen for the purpose of illustrating the preferred embodiment of my invention, because that type of scale is well known through extensive commercial use, and is described in detail in my Patent No. 1,166,128, issued December 28, 1915, of which this application is a division. Inasmuch as the present invention is not dependent for its operation upon any particular form of scale mechanism, no attempt is made in this application to show a complete scale mechanism, nor to delineate the action of the scale in its load-counterbalancing or weighing operations; only so much of the scale mechanism being shown as is necessary to clearly portray the operation and co-action of the scale mechanism with the features forming the claimed invention herein disclosed.

Referring to the drawings, 5 designates a suitable base above which is fulcrumed a scale beam 6 supporting a scale pan or platter 7 and connected within a housing 8 with a pendulum load-counterbalancing mechanism (not shown) which is so connected and arranged as to swing in a vertical plane to offset the weight of a commodity placed upon the scale pan 7. The scale beam comprises an irregular casting weighted at its outer end and provided with a pair of knife edge pivots 9 which are arranged to seat within agates 10 suitably mounted within apertures in the standards 11 mounted adjacent the forward end of the base 5. The scale platter 7 preferably consists of the usual casting 12 supporting a disk 13 of glass or other suitable material clamped in place by means of a thumb screw 14 and resting upon supports 15 of rubber or other suitable material. To maintain the scale pan in substantially horizontal position, the casting 12 is provided with a downwardly projecting rod or stud 16 which is pivoted within the base to a check link (not shown) of any approved construction. A dash-pot 17 is suitably connected to the scale beam to dampen the movements of the scale beam and to aid in preventing the transmission of shocks to the pendulum and indicating mechanism of the scale should a commodity be placed upon the scale platform carelessly or with intentional violence. The inner end of the scale beam 6 projects into the housing 8 within which it is connected to a rack bar (not shown) which latter engages at its upper end a pinion mounted upon the shaft carrying the rotary chart. The features just referred to are common and well known in this art and need not be specifically described.

The upper ends of the standards 11 are recessed, (see Fig. 2) for the reception of agates 10 and the latter are provided with the usual V-shaped grooves for the reception of the knife-edge pivots 9 of the beam. At a point substantially opposite the knife-edge pivots, each standard is provided with a tapped opening receiving the shouldered screw 18 which is adjustable in said opening and may be locked in any adjusted position by means of the set screw 19. The screw 18 is in turn bored and tapped concentrically to receive a screw 20 (see Fig. 3), which bears upon its inner end a head 21 of hardened steel or other suitable material which may be adjusted with relation to the screw 18 and is held in adjusted position by means of the lock nut 22. The recess in the standard is closed by a cap plate 23 having a flange 24 at one edge, which depends within the side walls of the recess over the knife edge. By virtue of this construction the agates 10 may be set in position in the recess and secured therein by means of cement or other suitable material for the reception of the knife-edge pivots 9 and lateral motion or side play of the beam and knife-edges may be prevented by adjusting the heads 21 with relation to the screw 18 so that when the latter are locked in their ultimate position, the heads 21 barely clear the ends of the knives 9 and prevent endwise movement thereof. In positioning the head 21 the screw 20 is first placed within the bore of the screw 18 and is locked in any desired position by means of the lock nut 22, whereupon the screw 18 is inserted into the threaded opening in the standard and suitably adjusted to advance the head 21 into close proximity to the end point of the knife-edge, in which position it is locked by means of the set screw 19. The cap plate 23 is then secured in position and in conjunction with the walls of the recess forms substantially a complete closure so that the bearing is as nearly dust-proof as is compatible with the rocking of the knives. Similar means for preventing endwise movement of the casting 12 of the scale pan may be provided if desired.

From the above it will be apparent that I have provided a simple, efficient and easily adjusted means for preventing the lateral play of the scale beam within its bearings, which means may be securely held in any adjusted position and easily removed therefrom. It will also be apparent that my invention is useful wherever a knife-edge pivot is or may be employed, whether it be in scales of the character shown herein, in scales of any other type or character, or in machines, instruments or mechanisms other than scales in which a knife-edge pivot is or may be employed, it being understood that the construction herein illustrated discloses merely an exemplification of my invention which is susceptible to modification, variation and change within the scope of the appended claims.

Having described my invention, I claim:

1. In a scale, a scale beam having knife-edge pivots, a base having standards thereon for the support of the beam, bearings in said standards for the knives of the beam, screws threaded in the standards opposite the bearing, and hardened heads adjustably mounted in said screws against which the knives may bear endwise.

2. In a scale, a scale beam having knife-edge pivots, a base having standards thereon for the support of the beam, bearings in said standards for the knives of the beam, screws adjustably mounted in the standards and longitudinally bored and tapped, other screws extending into the bore of the first-named screws, and bearing heads adapted to limit the endwise movement of the knives.

3. In a scale, a scale beam having knife-edge pivots, a base having standards thereon for the support of the beam, bearings in said standard for the knives of the beam, screws adjustably mounted in the standards and longitudinally bored and tapped, other screws extending into the bore of the first-named screws, bearing heads adapted to limit the endwise movement of the knives, and locking means for securing the screws in adjusted position.

4. In a scale, in combination with a main beam and its knives, of supports for the latter having cavities in their upper ends, bearing blocks seated within the cavities for the support of the knives, adjustable heads adapted to limit endwise play of the knives, and covers for the cavities.

5. In a scale, in combination with a main beam and its knives, of supports for the latter having cavities in their upper ends, bearing blocks seated within the cavities for the support of the knives, adjustable heads adapted to limit endwise play of the knives, and covers for the cavities having downwardly-projecting flanges extending over the knives.

6. A knife edge bearing comprising a knife, the ends of which are cut away from the edge thereof, bearing blocks upon which the edge of the knife rests, standards supporting the bearing blocks and heads mounted independently of the bearing blocks and adjustable toward and from the same, and adapted to limit the longitudinal movement of the knife by contact substantially only in the line of the edge of the blade.

CLARENCE H. HAPGOOD.

Witness:
K. E. HAYES.